United States Patent
Xu et al.

(10) Patent No.: US 11,288,210 B2
(45) Date of Patent: Mar. 29, 2022

(54) METHOD, DEVICE AND COMPUTER PROGRAM PRODUCT FOR MANAGING STORAGE SYSTEM

(71) Applicant: EMC IP Holding Company LLC, Hopkinton, MA (US)

(72) Inventors: Xinlei Xu, Beijing (CN); Lifeng Yang, Beijing (CN); Jian Gao, Beijing (CN); Jibing Dong, Beijing (CN); Jianbin Kang, Beijing (CN); Hongpo Gao, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 256 days.

(21) Appl. No.: 16/356,417

(22) Filed: Mar. 18, 2019

(65) Prior Publication Data
US 2020/0026663 A1 Jan. 23, 2020

(30) Foreign Application Priority Data
Jul. 20, 2018 (CN) .......................... 201810803486.0

(51) Int. Cl.
| | |
|---|---|
| G06F 3/06 | (2006.01) |
| G06F 12/00 | (2006.01) |
| G06F 13/00 | (2006.01) |
| G06F 12/122 | (2016.01) |

(52) U.S. Cl.
CPC ...... *G06F 12/122* (2013.01); *G06F 2212/608* (2013.01)

(58) Field of Classification Search
CPC .. G06F 12/123; G06F 12/126; G06F 12/0284; G06F 12/0866

USPC .................................................. 711/131, 133
See application file for complete search history.

(56) References Cited

U.S. PATENT DOCUMENTS

| | | | |
|---|---|---|---|
| 5,706,467 A | 1/1998 | Vishlitzky et al. | |
| 5,751,993 A | 5/1998 | Ofek et al. | |
| 5,787,473 A | 7/1998 | Vishlitzky et al. | |
| 6,715,039 B1 | 3/2004 | Levin-Michael et al. | |
| 10,509,731 B1 | 12/2019 | Michaud et al. | |
| 10,942,867 B2 | 3/2021 | Desai | |
| 2012/0137059 A1* | 5/2012 | Yang ..................... | G06F 3/0659 711/104 |
| 2013/0080689 A1* | 3/2013 | Jo ....................... | G06F 12/0246 711/103 |

(Continued)

*Primary Examiner* — Mohamed M Gebril
(74) *Attorney, Agent, or Firm* — BainwoodHuang

(57) ABSTRACT

Techniques manage a storage system. In accordance with such techniques, an access request for target data is received; a storage position of the target data is determined, the storage position indicating one of a storage device and a cache; a target element corresponding to the target data is determined from a first replacement list and a second replacement list associated with the first replacement list based on the storage position, the first replacement list including at least a counting element, the counting element indicating an access count of data in the storage device, the second replacement list including a low-frequency access element, the low-frequency access element indicating a cache page with a low access frequency in the cache; and a position of the target element in a replacement list where the target element exist is updated. Therefore, the overall performance of the storage system can be improved.

31 Claims, 9 Drawing Sheets

(56) References Cited

U.S. PATENT DOCUMENTS

| | | | |
|---|---|---|---|
| 2014/0281110 A1* | 9/2014 | Duluk, Jr. | G06F 12/123 |
| | | | 710/313 |
| 2014/0325121 A1* | 10/2014 | Akutsu | G06F 3/0683 |
| | | | 711/103 |
| 2017/0262173 A1* | 9/2017 | Song | G06F 3/0679 |
| 2018/0089107 A1* | 3/2018 | Yan | G06F 12/0862 |
| 2018/0276141 A1* | 9/2018 | Kato | G06F 12/0806 |
| 2020/0026663 A1* | 1/2020 | Xu | G06F 12/122 |

* cited by examiner

METHOD, DEVICE AND COMPUTER PROGRAM PRODUCT FOR MANAGING STORAGE SYSTEM

CROSS-REFERENCE TO RELATED APPLICATION(S)

This application claims priority to Chinese Patent Application No. CN201810803486.0, on file at the China National Intellectual Property Administration (CNIPA), having a filing date of Jul. 20, 2018, and having "METHOD, DEVICE, AND COMPUTER PROGRAM PRODUCT FOR MANAGING STORAGE SYSTEM" as a title, the contents and teachings of which are herein incorporated by reference in their entirety.

FIELD

Various implementations of the present disclosure relate to management of storage systems, and more specifically, to a method, device and computer program product for cache page management.

BACKGROUND

In a storage system including a disk array, caches are usually utilized to increase the speed for accessing data in the storage system. Normally the first layer cache is a cache such as DRAM, and the second layer cache is a cache such as SSD/NVMe. For the second layer cache, it is desirable to reduce promotion counts of data on disks to cache pages while increasing the hit rate of cache pages in the cache. Therefore, there is a need for an improved solution to increase the storage system performance.

SUMMARY

Implementations of the present disclosure provide a method, device and computer program product for managing a storage system.

In a first aspect of the present disclosure, provided is a method for managing a storage system. The method includes: receiving an access request for target data; determining a storage position of the target data, the storage position indicating one of a storage device and a cache; determining, based on the storage position, a target element corresponding to the target data from a first replacement list and a second replacement list associated with the first replacement list, the first replacement list including at least a counting element, the counting element indicating an access count of data in the storage device, the second replacement list including a low-frequency access element, the low-frequency access element indicating a cache page with a low access frequency in the cache; and updating a position of the target element in a replacement list where the target element exist.

In a second aspect of the present disclosure, provided is a device for managing a storage system. The device includes at least one processing unit and at least one memory. The at least one memory is coupled to the at least one processing unit and stores instructions executed by the at least one processing unit. The instructions, when executed by the at least one processing unit, causes the device to perform acts including: receiving an access request for target data; determining a storage position of the target data, the storage position indicating one of a storage device and a cache; determining, based on the storage position, a target element corresponding to the target data from a first replacement list and a second replacement list associated with the first replacement list, the first replacement list including at least a counting element, the counting element indicating an access count of data in the storage device, the second replacement list including a low-frequency access element, the low-frequency access element indicating a cache page with a low access frequency in the cache; and updating a position of the target element in a replacement list where the target element exist.

According to a third aspect of the present disclosure, there is provided a computer program product. The computer program product is tangibly stored on a non-transient computer readable medium and includes machine executable instructions, the machine executable instructions, when executed, causing the machine to implement a method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example implementations of the present disclosure with reference to the accompanying drawings, the above and other objectives, features, and advantages of the present disclosure will become more apparent, wherein the same reference numeral usually refers to the same component in the example implementations of the present disclosure.

Throughout the figures, the same or corresponding numeral refers to the same or corresponding part.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

Manage Cache by Traditional LRU Algorithm

Figure 1:
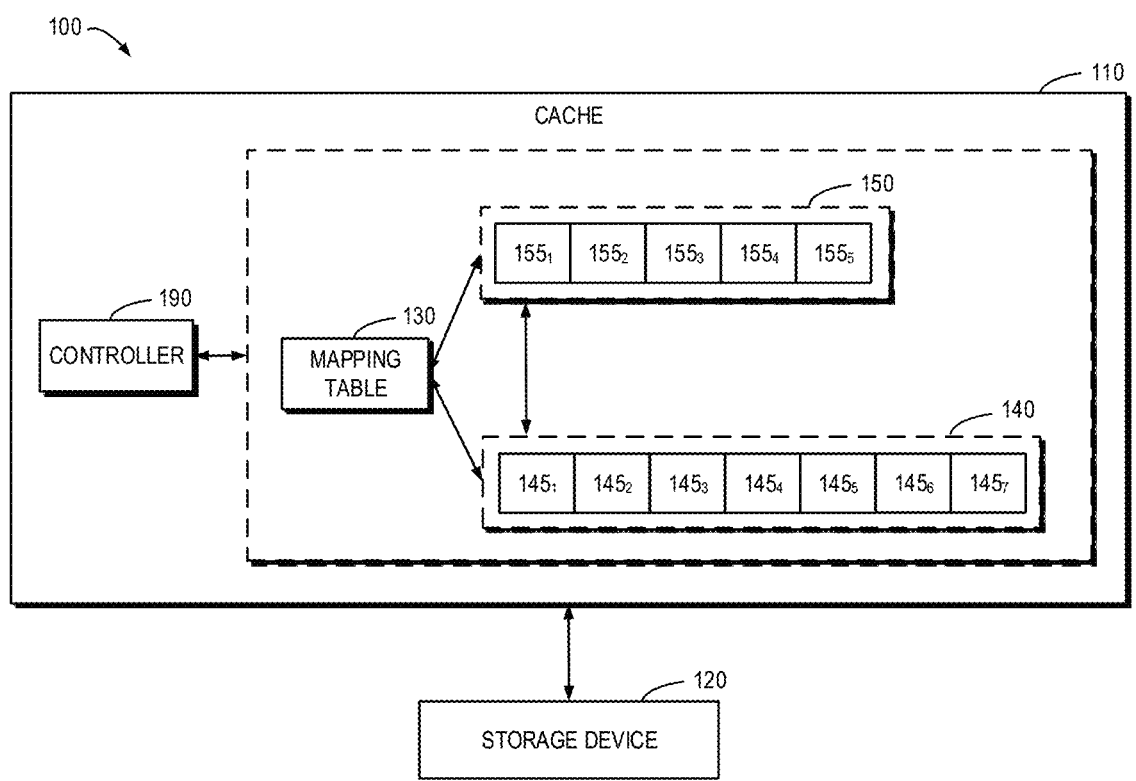
FIG. 1 shows a schematic view of one example of a traditional storage system.

FIG. 1 shows a schematic view of one example of a traditional storage system 100 100. As depicted, the storage system 100 includes a cache 110 and a storage device 120. The cache 110 may be a cache such as SSD/NVMe/NVDIMM, etc. The storage device 120 may be a Redundant Array of Independent Disks (RAID) and the like. However, examples of the storage device 120 are not limited to this and may be an electric storage device, a magnetic storage device, an optical storage device, an electromagnetic storage device, a semiconductor storage device, or any appropriate combination thereof.

The cache 110 includes multiple volumes, and each volume may include multiple cache pages. In addition, the cache 110 further includes a mapping table 130, an access history list 140, a page replacement list 150 and a controller 190. The mapping table 130 may include access information. When data exists in the cache 110, the access information may indicate a correspondence between an address of data in the storage device 120 and a cache page where data resides. In addition, when data does not exist in the cache 110, the access information may indicate an access history of data in the storage device 120, e.g. the number of times data in the storage device 120 has been accessed.

The access history list 140 may include history information $145_1$-$145_7$ (collectively referred to as "history information"). Here, the amount of the history information 145 is merely example, and the access history list 140 may include any appropriate amount of the history information 145. The history information 145 may include an access history of data, the data residing in the storage device 120 and not in the cache 110. The access history may be, for example, the number of times data in the storage device 120 has been accessed. In some implementations, the access information may include identification (e.g. an address, an identifier, a name, etc.) of the history information 145, so that the access history included in the history information 145 may be determined from the access information.

The page replacement list 150 may include page elements $155_1$-$155_5$ (collectively referred to as "page element 155"). Here, the number of the page elements 155 is merely example, and the page replacement list 150 may include any appropriate number of the page elements 155. The page element 155 may indicate a cache page. In some implementations, the page element 155 (e.g. page element $155_1$) at a start position of the page replacement list 150 may indicate the most recently accessed cache page, while the page element 155 (e.g. page element $155_5$) at an end position of the page replacement list 150 may indicate the least recently accessed cache page. In addition, in some implementations, for each volume, there may exist one page replacement list 150.

The controller 190 may manage the cache 110, e.g. by a Least Recently Used (LRU) algorithm. The controller 190 may record the number of times data in the storage device 120 has been accessed, identify data being accessed in a large number of times, and promote or cache the data being accessed in a large number of times from the storage device 120 to the cache 110. In this case, when an access request is received next time, the controller 190 will look up in the mapping table 130 and find data is moved to the cache 110, so that data is read from/written to the cache 110 so as to accelerate the processing of the access request.

In some implementations, an example process of the controller 190 managing the cache 110 is as below:

Step 1: When the controller 190 receives an access request for target data, the controller 190 first looks up in the mapping table 130 to determine whether in the mapping table 130 there exists access information corresponding to the target data, and content indicated by the access information. If the access information indicates a correspondence between an address of the target data in the storage device 120 and a cache page where the target data resides (also called "hit"), then the flow jumps to step 5; if the access information indicates the number of times the target data in the storage device 120 has been accessed (also called "pseudo hit"), then the flow jumps to step 3; if no access information corresponding to the target data exists in the mapping table 130, then the flow jumps to step 2.

Step 2: The controller 190 allocates the history information 145 to the target data from the end position of the access history list 140, so as to track the number of times the target data in the storage device 120 has been accessed, and set a position of the allocated history information 145 as the start position of the access history list 140, in other words, insert the allocated history information 145 to the start position of the access history list 140. In addition, the controller 190 creates in the mapping table 130 access information pointing to the history information 145 and creates in the page replacement list 150 a count element pointing to the history information 145 based on the allocated history information 145. Then, the flow jumps to step 4.

Step 3: The controller 190 increments the history information 145 corresponding to the target data, e.g. increasing an access count of the target data in the storage device 120 by 1; if the access count is larger than a predefined threshold, then the controller 190 promotes or caches the target data from the storage device 120 to the cache 110, changes the access information in the mapping table 130 to indicate a correspondence between an address of the target data in the storage device 120 and a cache page where the target data resides, and adds in the page replacement list 150 a page element 155 indicating the cache page where the target data resides. Then, the flow jumps to step 4.

Step 4: The controller 190 sends the access request to the storage device 120, and when an access operation in the storage device 120 completes, the controller 190 sends a completion notification to an up-layer driver.

Step 5: The controller 190 sets a position of the page element 155 corresponding to the target data as the start position of the page replacement list 150, sends the access request to the cache 110, and when an access operation in the cache 110 completes, the controller 190 sends a completion notification to an up-layer driver.

In this way, the controller 190 achieves management of the cache 110. However, since the controller 190 does not record access frequency for a cache page, only access time of the cache page will affect the position of the page element 155, which corresponds to the cache page, in the page replacement list 150, while access frequency for the cache page will not affect the position. Therefore, in this way, it is possible that data in a cache page with a high access frequency in the cache 110 are replaced by recently accessed data.

For example, as shown in FIG. 1, suppose the predefined threshold is 3, and a hit count of the cache page in the cache 110 which corresponds to the page element $155_5$ at the end position of the page replacement list 150 is 10. When the access count of the target data in the storage device 120 indicated by the history information $151_1$ is larger than 3, the controller 190 promotes or caches the target data from the storage device 120 to the cache 110 so as to replace data in the cache page corresponding to the page element $155_5$. In other words, least recently accessed data with the access count of 10 in the cache 110 are replaced by most recently accessed data with the access count of 3 in the storage device 120.

The foregoing drawback is especially highlighted in cases of burst of access to infrequently used data, cyclic access to a file that is slightly larger than the cache size of a cache, etc. To solve this problem, the controller 190 may manage the cache 110 by other means, e.g. a Low Inter-Reference Recency Set (LIRS) algorithm to be described below.

Manage Cache by Traditional LIRS Algorithm

Figure 2:
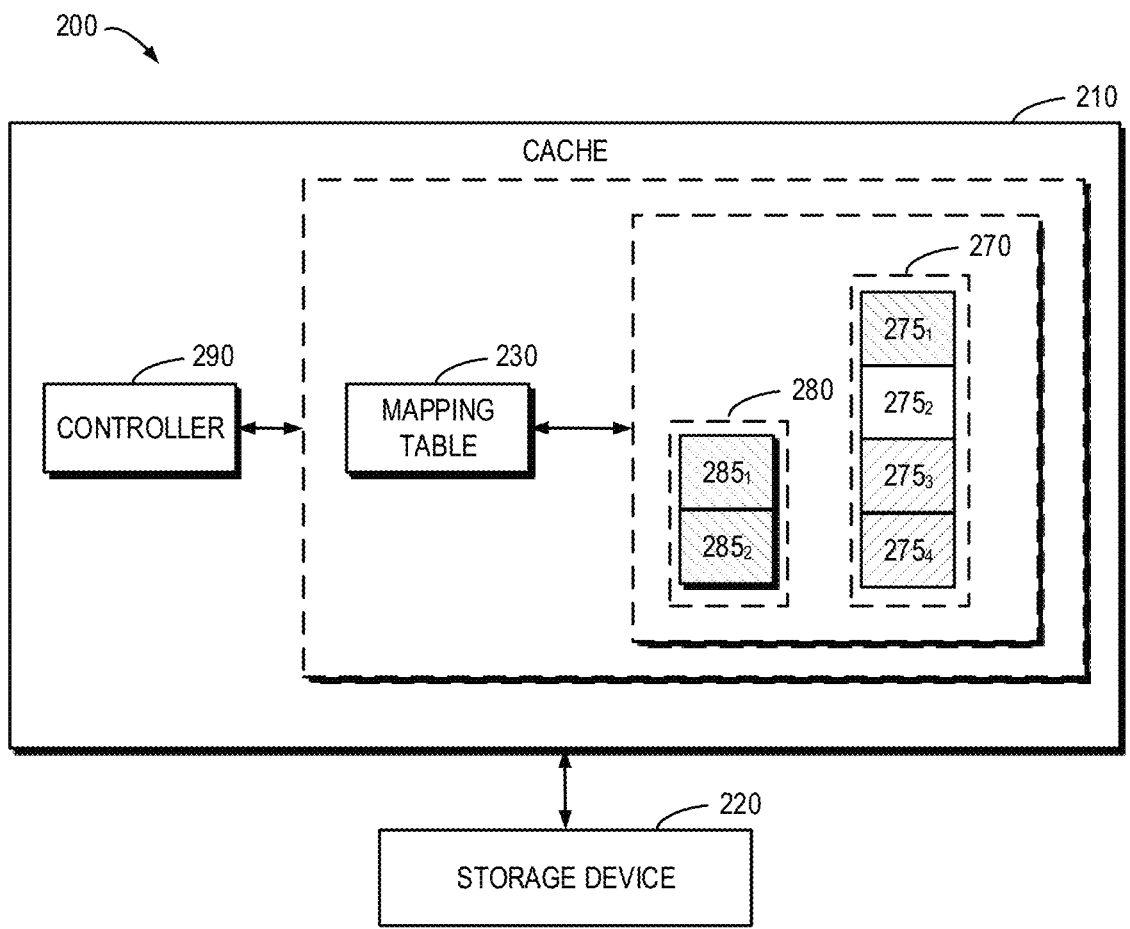
FIG. 2 shows a schematic view of another example of a traditional storage system.

FIG. 2 shows a schematic view of one example of a traditional storage system 200 using a LIRS algorithm. The principles of the LIRS algorithm lie in dividing storage blocks into two sets: a high-frequency access storage block set and a low-frequency access storage block set. Each block in the cache has a high-frequency access status or a low-frequency access status. Some low-frequency access storage blocks might not reside on the cache, but the cache has a non-resident low-frequency access element indicating the non-resident low-frequency access storage block.

In addition, the principles of the LIRS algorithm also lie in dividing the cache into a major part and a minor part. The major part is used to store high-frequency access storage blocks, while the minor part is used to store low-frequency access storage blocks. The sum of the size of the major part and the size of the minor part is equal to the size of the cache. When an access request for target data encounters a miss in the cache, and a storage block in the cache needs to be replaced with target data, the LIRS algorithm chooses a low-frequency access storage block residing on the cache. High-frequency access storage blocks always reside on the cache, so there are no misses for access requests for high-frequency access storage blocks. On the contrary, since the minor part of the cache which is used to store low-frequency access storage blocks is very small (usually as small as 1% of the cache size), an access request for a low-frequency access storage block is likely to encounter a miss.

Further, the principles of the LIRS algorithm lie in using a global list to manage all storage blocks in the cache. When a cached block evicts out of the cache, information associated with the storage block still exists in the global list.

The storage system 200 shown in FIG. 2 is a LISR algorithm-based storage system. Like the storage system 100, the storage system 200 includes a cache 210 and a storage device 220. The cache 210 includes multiple volumes, and each volume may include multiple cache pages. In addition, the cache 210 further includes a mapping table 230 and a controller 290.

Unlike the storage system 100, access information in the mapping table 230 in the storage system 200 cannot indicate an access history of data in the storage system 220, and the cache 210 is managed using two page replacement lists 270 and 280.

The page replacement list 270 may be used to store elements indicating recently accessed storage blocks, which elements may include high-frequency access block elements (e.g. elements $275_3$, $275_4$), low-frequency access block elements (e.g. element $275_1$) as well as non-resident low-frequency access elements (e.g. element $275_2$). The high-frequency access block element indicates a storage block with a high access frequency in the cache 210. The low-frequency access block element indicates a storage block with a low access frequency in the cache 210. By contrast, the page replacement list 280 may be used to store elements indicating less recently accessed storage blocks, which elements may only include low-frequency access block elements (e.g. elements $285_1$, $285_2$).

However, since non-resident low-frequency access elements may exist in the page replacement list 270, the length of the page replacement list 270 is not fixed and even might exceed the limit of the storage system 200. In addition, once target data is accessed, the target data is cached to the cache 210, which brings about expensive overheads to the storage system 200 because promoting/caching the target data from the storage device 220 to the cache 210 and flushing/storing low-frequency access storage blocks in the cache 210 to the storage device 220 is expensive. Therefore, although the storage system 200 improves the hit rate of target data as compared with the storage system 100, the storage system 200 also increases counts of promoting/caching data from the storage device 220 to the cache 210, which is not desired.

Storage System of Present Disclosure

Example implementations of the present disclosure propose a solution for managing a storage system. In the solution, a controller in the storage system receives an access request for target data and determines a storage position of the target data. The storage position indicates one of a storage device and a cache. Then, the controller determines a target element corresponding to the target data from a first replacement list and a second replacement list associated with the first replacement list based on the storage position. The first replacement list at least includes a counting element, which indicates the number of times data in the storage device has been accessed. The second replacement list includes a low-frequency access element, which indicates a cache page with a low access frequency in the cache. Next, the controller updates a position of the target element in a replacement list where the target element exists. In this way, a hit rate of the target data in the storage system may be increased, and counts of promoting/caching data from the storage device to the cache may be reduced. Therefore, the efficiency and performance of the storage system may be increased in a concise and effective manner, and further the user experience can be improved.

Figure 3:
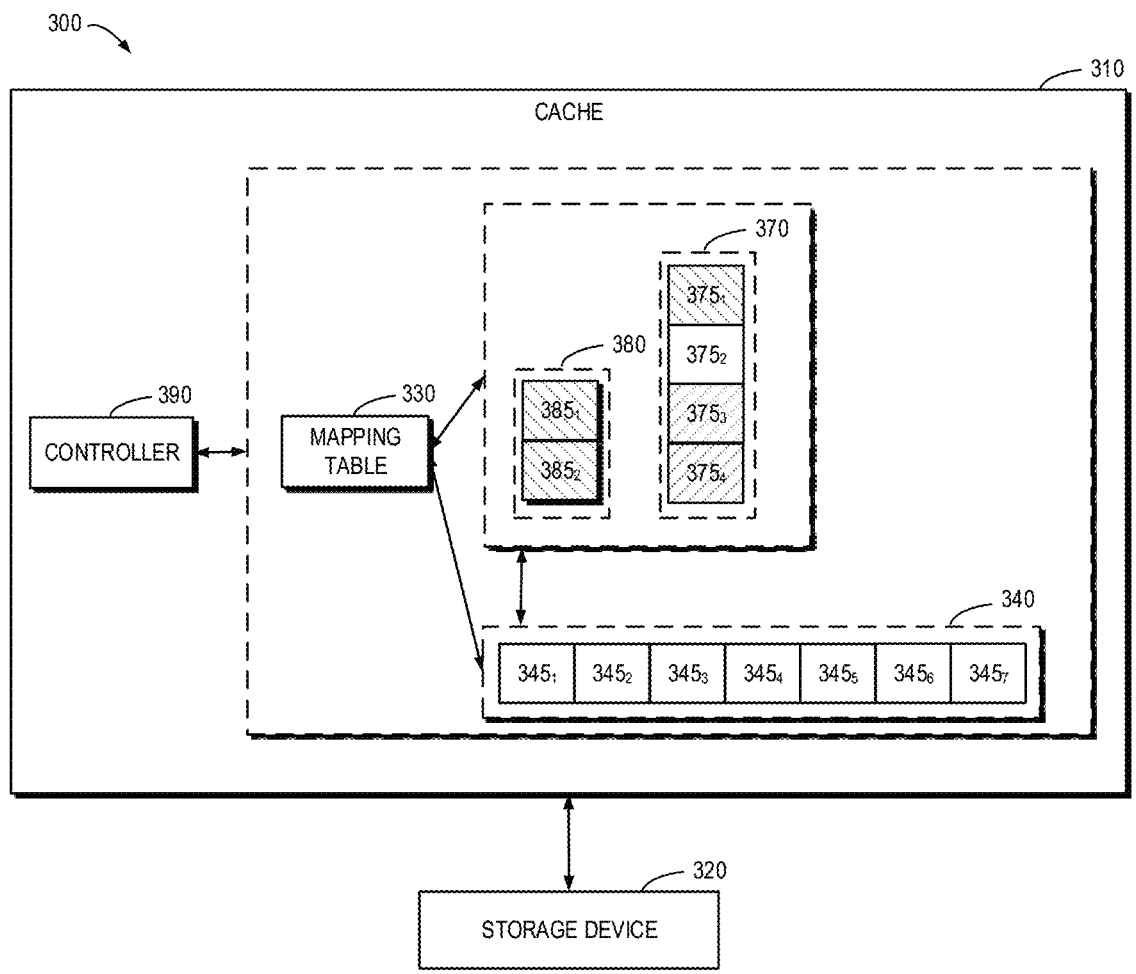
FIG. 3 shows a schematic view of an example of a storage system in which implementations of the present disclosure may be implemented.

FIG. 3 shows a schematic view of a storage system 300 in which implementations of the present disclosure may be implemented. As depicted, the storage system 300 includes a cache 310 and a storage device 320. The cache 310 may be a cache such as SSD/NVMe/NVDIMM, etc. The storage device 320 may be a Redundant Array of Independent Disks (RAID) and the like. However, examples of the storage device 320 are not limited to this and may be an electric storage device, a magnetic storage device, an optical storage device, an electromagnetic storage device, a semiconductor storage device, or any appropriate combination thereof.

The cache 310 includes multiple volumes, and each volume may include multiple cache pages. In addition, the cache 310 further includes a mapping table 330, an access history list 340, a page replacement list 370 (also referred to as "a first replacement list"), a page replacement list 380 (also referred to as "a second replacement list") and a controller 390. Although this figure only illustrates one first replacement list 370 and one second replacement list 380, in some implementations, there may exist one first replacement list 370 and one second replacement list 380 for each volume. Therefore, when the cache 310 includes multiple volumes, there may exist the first replacement lists 370 and the second replacement lists 380 corresponding to each volume respectively. In addition, the controller 390 may manage the cache 310. Management operations executed by the controller 390 will be described in conjunction with FIGS. 5 to 9.

The mapping table 330 may include access information. When data exists in the cache 310, the access information may indicate a correspondence between an address of data in the storage device 120 and a cache page where data exists. In addition, when data does not exist in the cache 310, the access information may indicate an access history of data in the storage device 320, e.g. the number of times data in the storage device 120 has been accessed.

The access history list 340 may be used to track access history information of missed target data in the cache 310. In some implementations, the access history list 340 may include history information $345_1$-$345_7$ (collectively referred to as "history information 345"). Here, the amount of the history information 345 is merely example, and the access history list 340 may include any appropriate amount of the history information 345. The history information 345 may include an access history of data, the data existing in the storage device 320 and not in the cache 310. The access history may be, for example, the number of times data in the storage device 320 has been accessed.

The access history list 340 may be associated with the mapping list 330 and the first replacement list 370. In some implementations, the history information 345 may be linked to the access information in the mapping list 330 and a counting element 375 in the first replacement list 370. For example, the access information 345 and the counting element 375 may include identification (e.g. an address, an identifier, a name, etc.) of the history information 345, so that the access history included in the history information 345 may be determined from the access information 345 and the counting element 375. On the contrary, the access history list 340 cannot be associated with the second replacement list 380, e.g. the history information 345 cannot be linked to any element in the second replacement list 380.

In some implementations, the size (e.g. the amount of the included history information 345) of the access history list 340 depends on the total cache size, the cache page size and the percentage of effective caches. For example, the amount of the history information 345 may be derived from an equation below:

$$n = \frac{(s_{d\_1} + s_{d\_2} + \ldots + s_{d\_m}) * p\%}{s_c}, \quad (1)$$

N denotes the total amount of the history information 345 in the access history list 340; $S_{d\_1}$ to $S_{d\_m}$ denote the size of m caches (collectively denoted as the cache 310) in the storage system 300 respectively, m being a natural number larger than 1; p denotes the percentage of effective caches; and $S_c$ denotes the size of one cache page.

The first replacement list 370 may be used to store elements $375_1$-$375_4$ (collectively referred to as "element 375") indicating recently accessed cache pages. Here, the number of the elements 375 is merely example, and the first replacement list 370 may include any appropriate number of the elements 375. The elements may include high-frequency access elements (e.g. elements $375_3$, $375_4$), low-frequency access elements (e.g. element $375_1$) as well as counting elements (e.g. element $375_2$). The high-frequency access element indicates a cache page with a high access frequency in the cache 310. The low-frequency access element indicates a cache page with a low access frequency in the cache 310. The counting element indicates access counts of data in the storage device 320.

In some implementations, the element 375 (e.g. low-frequency access element $375_1$) at the start position of the first replacement list 370 may indicate the most recently accessed cache page in the first replacement list 370, and the element 375 (e.g. high-frequency access element $375_4$) at the end position of the first replacement list 370 may indicate the least recently accessed cache page in the first replacement list 370.

By contrast, the second replacement list 380 may be used to store elements $385_1$-$385_2$ (collectively referred to as "element 385") indicating less recently accessed cache pages. Here, the number of the elements 385 is merely example, and the second replacement list 380 may include any appropriate number of the elements 385. The elements only include low-frequency access elements (e.g. elements $385_1$ and $385_2$). In some implementations, the element 385 (e.g. low-frequency access element $385_1$) at the start position of the second replacement list 380 may indicate the most recently accessed cache page in the second replacement list 380, and the element 385 (e.g. high-frequency access element $385_2$) at the end position of the second replacement list 380 may indicate the least recently accessed cache page in the second replacement list 380.

In some implementations, the size (e.g. number) of high-frequency access elements and low-frequency access elements depends on the total cache size, the cache page size and the percentage of effective caches. For example, the number of high-frequency access elements and low-frequency access elements may be derived from an equation below:

$$\Sigma_{j=0}^{m}(s_{d\_j}) * p\% = \Sigma_{i=0}^{n}(h_i + l_i) * s_c \quad (2)$$

N denotes the total number of elements in both the first replacement list 370 and the second replacement list 380, i.e. the total number of cache pages in the cache 310; $h_1$ to $h_n$ denote the number of high-frequency access elements in the first replacement list 370 for the $1^{st}$ volume to the $n^{th}$ volume respectively; $l_1$ to $l_n$ denote the number of low-frequency access elements in both the first replacement list 370 and the second replacement list 380 for the $1^{st}$ volume to the $n^{th}$ volume respectively; $S_{d\_1}$ to $S_{d\_m}$ denote the size of m caches (collectively denoted as the cache 310) in the storage system 300 respectively, m being a natural number larger than 1; p denotes the percentage of effective caches; and $S_c$ denotes the size of one cache page.

As seen by comparing Equation (1) with Equation (2), the total number of elements in both the first replacement list 370 and the second replacement list 380 or the total number of cache pages in the cache 310 is equal to the total amount of the history information 345 in the access history list 340. In other words, for each cache page, there exist a corresponding element in the replacement list and history information in the access history list 340.

In addition, in some implementations, the proportion of high-frequency access elements (or the cache pages to which the high-frequency access elements indicate) to low-frequency access elements (or the cache pages to which the low-frequency access elements indicate) is fixed for each volume. Further, the number of high-frequency access elements is typically larger than the number of low-frequency access elements. For example, the ratio of the number of high-frequency access elements to the number of low-frequency access elements may be 4:1 or 5:1, which may be denoted as an example equation below:

$$\frac{l_0}{h_0} = \frac{l_1}{h_1} = \frac{l_2}{h_2} = \ldots = \frac{l_n}{h_n}, \quad (3)$$

$h_1$ to $h_n$ denote the number of high-frequency access elements in the first replacement list 370 for the $1^{st}$ volume to the $n^{th}$ volume respectively; $l_1$ to $l_n$ denote the number of low-frequency access elements in both the first replacement list 370 and the second replacement list 380 for the $1^{st}$ volume to the $n^{th}$ volume respectively.

In view of the example structure described above, implementations of the present disclosure may be implemented based on principles below. In some implementations, when target data is promoted/cached from the storage device 320 to the cache 310, first an element corresponding to a cache page where the target data is stored is added to the first replacement list 370, and the element is set as a high-frequency access element. When a high-frequency access element cools (e.g. has not been accessed for a long time), the high-frequency access element is moved to the second replacement list 380 and is set as a low-frequency access element.

Additionally, in some implementations, when the cache 310 is created, all history information 345 in the access history list 340 is also created. If there exists a counting element in the first replacement list 370, then history information corresponding to the counting element also exists in the access history list 340.

Moreover, in some implementations, an element at the end position of the first replacement list 370 must be a high-frequency access element or a low-frequency access element. When a high-frequency access element in the first replacement list 370 cools and hence is moved to the second replacement list 380, if an element at the end position of the first replacement list 370 is a counting element, then the counting element will be removed from the first replacement list 370 but still exists in the access history list 340. In addition, the order of other elements in the first replacement list 370 from which the counting element has been removed remains unchanged.

Further, in some implementations, for an access request missed in the mapping table 330, history information at the end position of the access history list 340 is set as history information of target data which the access request is aimed to, and the history information will be added to the start position of the access history list 340. In addition, a counting element is created for the target data, and the counting element is added to the start position of the first replacement list 370. Further, access information indicating the number of times the target data in the storage device 320 has been accessed is created for the target data.

In this way, implementations of the present disclosure cause high-frequency accessed cache pages to be stored much longer than low-frequency accessed cache pages in the cache 310, thereby increasing the utilization and efficiency of the cache 310 and improving the overall performance of the storage system 300.

Method for Managing Storage System of Present Disclosure

Figure 4:
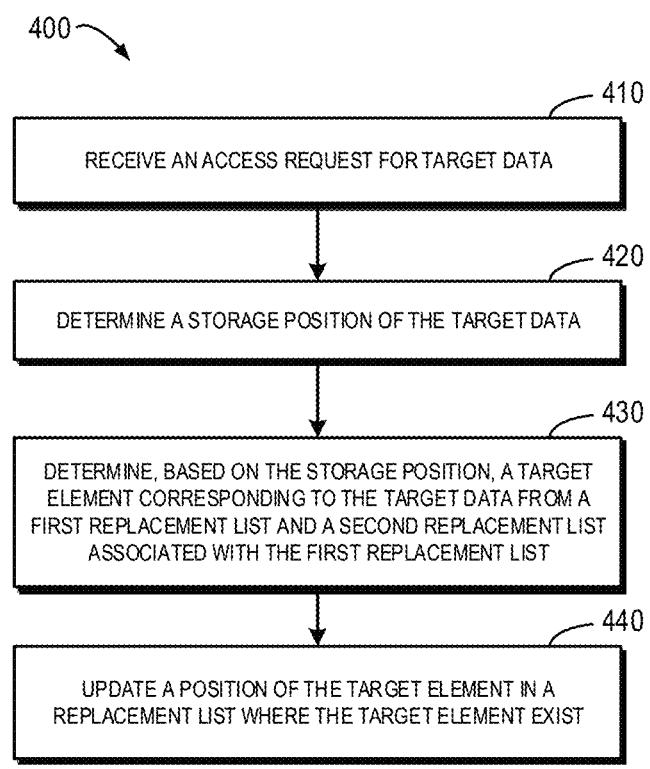
FIG. 4 shows a flowchart of an example of a method for managing a storage system according to implementations of the present disclosure.

FIG. 4 shows an example flowchart of a method 400 for managing a storage system according to implementations of the present disclosure. For example, the method 400 may be executed at the storage system 300 as shown in FIG. 3 or other appropriate system. For example, the method 400 may be executed by the controller 390 in the storage system 300 or the cache 310 or other associated computing device. The controller or computing device may be any appropriate controller or computing device that is implemented in the storage system 300 or the cache 310 in a centralized or distributed way, including but not limited to, a personal computer, a server, a client, a handheld or laptop device, a multiprocessor, a microprocessor, a set-top box, programmable consumer electronics, a network PC, a minicomputer, a mainframe computer, a distributed cloud as well as combinations thereof. In addition, the method 400 may further include an additional step that is not shown and/or omit a step that is shown, and the scope of the present disclosure is not limited in this regard.

The controller 390 receives an access request for target data at 410, and determines a storage position of the target data at 420. The storage position may indicate one of the storage device 320 and the cache 310. In some implementations, the controller 390 looks up access information associated with the target data in the cache 310, and determines, based on the access information, whether the target data exists on a cache page of the cache 310.

For example, the controller 390 may look up access information associated with the target data in the mapping table 330. As described above, when data exists in the cache 310, the access information may indicate a correspondence between an address of the data in the storage device 320 and a cache page where the data exists. In addition, when data does not exist in the cache, the access information may indicate an access history of the data in the storage device 320, e.g. access counts of the data in the storage device 320.

At 430, the controller 390 determines a target element corresponding to the target data from the first replacement list 370 and the second replacement list 380 associated with the first replacement list 370. In some implementations, when the controller 390 finds access information associated with the target data in the mapping table 330, and the access information indicates a correspondence between an address of the target data in the storage device 320 and a cache page where the target data exists, the controller 390 may determine the target data exists on a cache page of the cache 310. In this case, an element corresponding to the cache page in the first replacement list 370 and the second replacement list 380 is determined as a target element. The target element is one of a low-frequency access element and a high-frequency access element.

The first replacement list 370 at least includes a counting element. The counting element may indicate the number of times data in the storage device 320 has been accessed. In some implementations, the first replacement list 370 may further include a low-frequency access element and/or a high-frequency access element. The low-frequency access element indicates a cache page with a low access frequency in the cache 310. The high-frequency access element indicates a cache page with a high access frequency in the cache 310. The second replacement list 380 only includes a low-frequency access element.

Alternatively, when the target data does not exist on a cache page of the cache 310, the controller 390 may determine whether access information associated with the target data exists in the cache 310, the access information indicating the number of times the target data in the storage device 320 has been accessed. When the access information is determined as existing in the cache 310, the controller 390 determines a counting element corresponding to the access information in the first replacement list 370 as the target element.

Alternatively, when the access information is determined as not existing in the cache 310, the controller 390 allocates history information at an end position of the access history list 340 as history information associated with the target data, and adds the history information to a start position of the access history list 340. In addition, the controller 390 creates a counting element, which is linked to the history information and associated with the target data, as the target element in the first replacement list 370. Furthermore, the controller 390 further creates in the mapping table 330 access information that is linked to the history information and associated with the target data. Since the access information is linked to the history information, the access information may indicate the number of times the target data in the storage device 320 has been accessed.

At 440, the controller 390 updates a position of the target element in a replacement list where the target element exists. A detailed example of the act 440 will be described in conjunction with FIGS. 5 to 9. In this way, implementations of the present disclosure may reduce counts of promoting/caching data from the storage device 320 to the cache 310 while increasing the hit rate of target data. Further, the utilization and efficiency of the cache 310 is increased, and the overall performance of the storage system 300 is improved.

Figure 5:
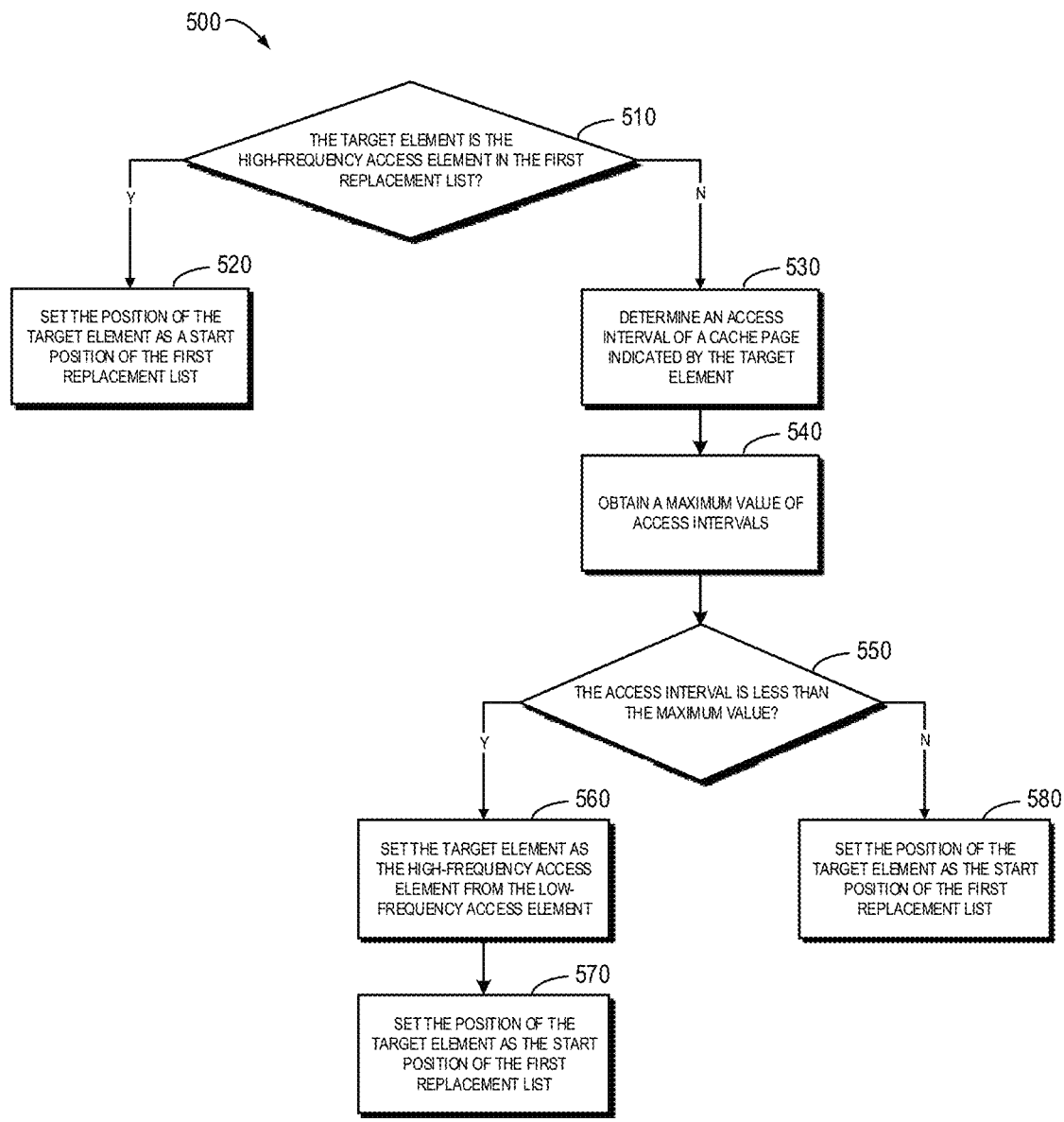
FIG. 5 shows a flowchart of one example of a method for updating a position of a target element in a replacement list according to implementations of the present disclosure.

FIG. 5 shows a flowchart of an example of a method 500 for updating a position of a target element in a replacement list according to implementations of the present disclosure. For example, the method 500 may be executed by the controller 390 as shown in FIG. 3. It should be understood the method 500 is an example implementation of the act 440, whereas implementations of the act 440 are not limited to this. In addition, the method 500 may further include an additional step that is not shown and/or may omit a step that is shown, and the scope of the present disclosure is not limited in this regard.

The method 500 pertains to the circumstance where a target element is in the first replacement list 370 and target data exists on a cache page of the cache 310. At 510, the controller 390 determines whether the target element is a low-frequency access element or a high-frequency access element in the first replacement list 370. When the target element is a high-frequency access element, at 520, the controller 390 sets a position of the target element as a start position of the first replacement list 370. Otherwise, when the target element is a low-frequency access element, at 530, the controller 390 determines an access interval of a cache page indicated by the target element. For example, the controller has received 3 access requests, among which the $1^{st}$ access request is aimed at cache page 1, the $2^{nd}$ access request is aimed at cache page 2 and the $3^{rd}$ access request is aimed at cache page 1. In this case, an access interval of cache page 1 is 2.

At 540, the controller 390 obtains a maximum value of access intervals of cache pages indicated by high-frequency access elements and low-frequency access elements in the first replacement list 370 and the second replacement list 380. At 550, the controller 390 determines whether the access interval is larger than the maximum value. When the access interval is less than the maximum value, at 560, the controller 390 sets the target element as the high-frequency access element from the low-frequency access element, and sets a position of the target element as a start position of the first replacement list 370. Alternatively, when the access interval is larger than the maximum value, at 580, the controller 390 sets a position of the target element as a start position of the first replacement list 370.

In this way, by means of implementations of the present disclosure, when the target element is in the first replacement list 370 and the target data exists on a cache page of the cache 310, a position of the target element in the replacement list may be updated, and hence the cache page may be replaced.

Figure 6:
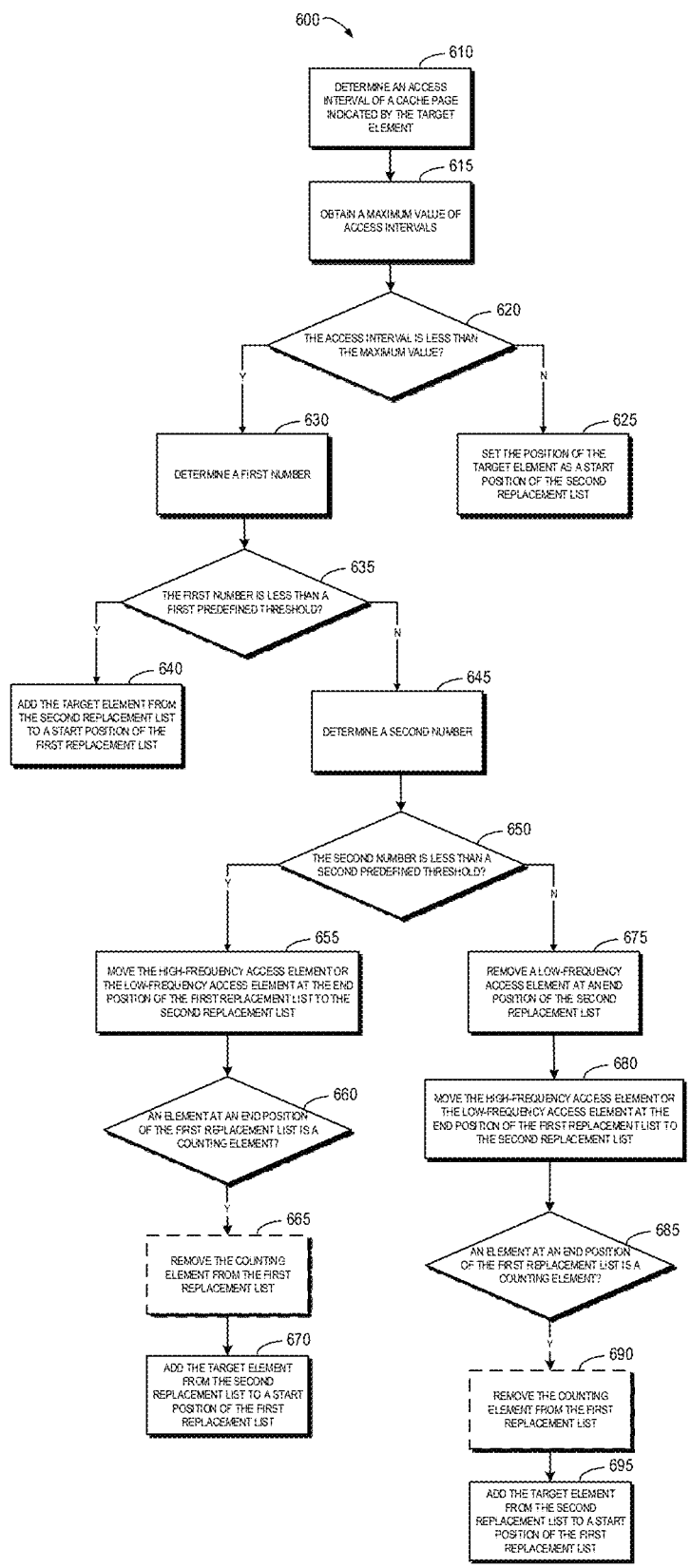
FIG. 6 shows a flowchart of another example of a method for updating a position of a target element in a replacement list according to implementations of the present disclosure.

FIG. 6 shows a flowchart of an example of a method 600 for updating a position of a target element in a replacement list according to implementations of the present disclosure. For example, the method 600 may be executed by the controller 390 as shown in FIG. 3. It should be understood the method 600 is an example implementation of the act 440, whereas implementations of the act 440 are not limited to this. In addition, the method 600 may further include an additional step that is not shown and/or may omit a step that is shown, and the scope of the present disclosure is not limited in this regard.

The method 600 pertains to the circumstance where a target element is in the second replacement list 380 and target data exists on a cache page of the cache 310. At 610, the controller 390 determines an access interval of a cache page indicated by the target element. At 615, the controller 390 obtains a maximum value of access intervals of cache pages indicated by high-frequency access elements and low-frequency access elements in the first replacement list 370 and the second replacement list 380.

At 620, the controller 390 determines whether the access interval is less than the maximum value. When the access interval is larger than the maximum value, at 625, the controller 390 sets a position of the target element as a start position of the second replacement list 380. Otherwise, when the access interval is less than the maximum value, at 630, the controller 390 determines the number (also referred to as "first number") of elements in the first replacement list 370.

At 635, the controller 390 determines whether the first number is less than a predefined threshold (also referred to as "first predefined threshold"). When the first number is less than the first predefined threshold, at 640, the controller 390 adds the target element from the second replacement list 380 to a start position of the first replacement list 370. Otherwise, when the first number is larger than the first predefined threshold, at 645, the controller 390 determines the number (also referred to as "second number") of elements in the second replacement list 380.

At 650, the controller 390 determines whether the second number is less than a predefined threshold (also referred to as "second predefined threshold"). When the second number is less than the second predefined threshold, at 655, the controller 390 moves a high-frequency access element or a low-frequency access element at an end position of the first replacement list 370 to the second replacement list 380. In addition, at 660, the controller 390 determines whether an element at an end position of the first replacement list 370 is a counting element. When the element at the end position of the first replacement list 370 is a counting element, at 665, the controller 390 removes the counting element from the first replacement list 370. At 670, the controller 390 adds the target element from the second replacement list 380 to a start position of the first replacement list 370.

Alternatively, when the second number is larger than the second predefined threshold, at 675, the controller 390 removes a low-frequency access element at an end position of the second replacement list 380. In addition, the controller 390 further releases a cache page corresponding to the removed low-frequency access element, e.g. returns the cache page to a page free list. At 680, the controller 390 moves a high-frequency access element or a low-frequency access element at the end position of the first replacement list 370 to the second replacement list 380. In addition, at 685, the controller 390 determines whether an element at an end position of the first replacement list 370 is a counting element. When the element at the end position of the first replacement list 370 is a counting element, at 690, the controller 390 removes the counting element from the first replacement list 370. At 695, the controller 390 adds the target element from the second replacement list 380 to a start position of the first replacement list 370.

In this way, by means of implementations of the present disclosure, when the target element is in the second replacement list 380 and the target data exists on a cache page of the cache 310, a position of the target element in the replacement list may be updated, and hence the cache page may be replaced.

Figure 7:
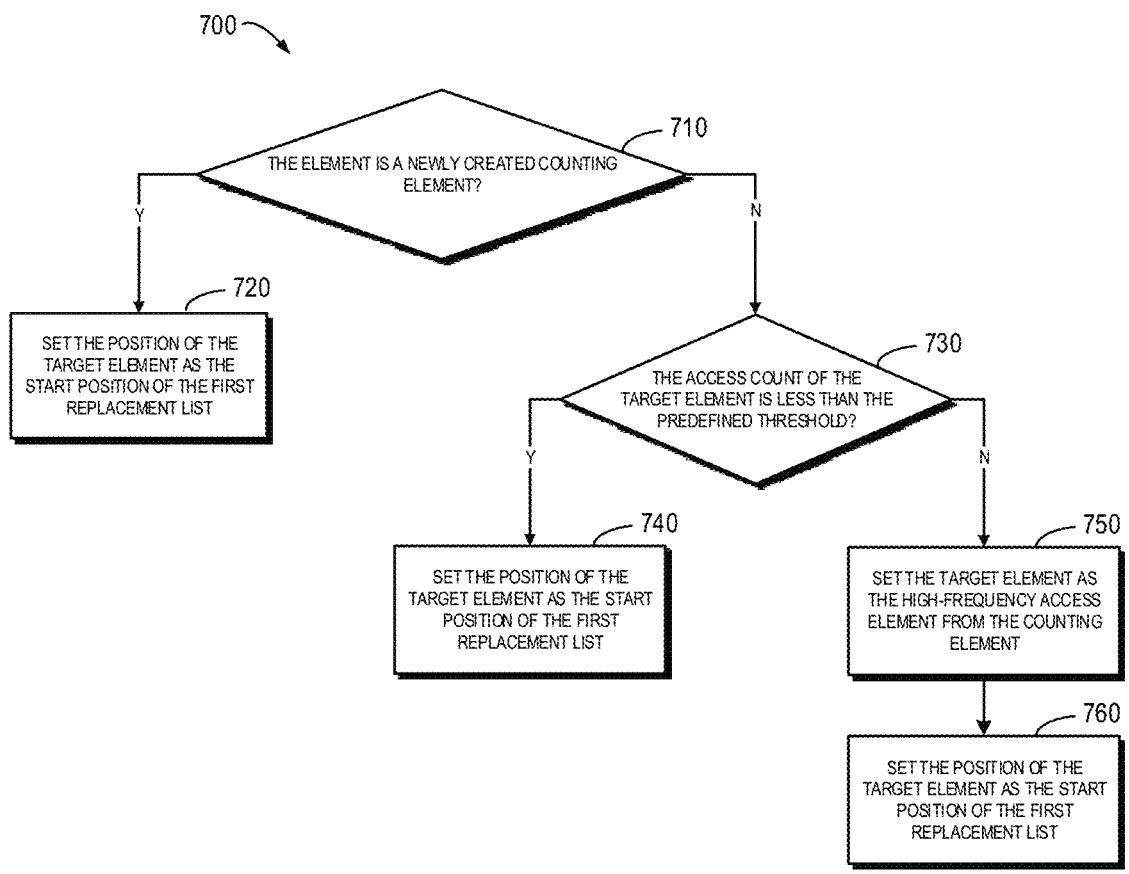
FIG. 7 shows a flowchart of a further example of a method for updating a position of a target element in a replacement list according to implementations of the present disclosure.

FIG. 7 shows a flowchart of an example of a method 700 for updating a position of a target element in a replacement list according to implementations of the present disclosure. For example, the method 700 may be executed by the controller 390 as shown in FIG. 3. It should be understood the method 700 is an example implementation of the act 440, whereas implementations of the act 440 are not limited to this. In addition, the method 700 may further include an additional step that is not shown and/or may omit a step that is shown, and the scope of the present disclosure is not limited in this regard.

The method 700 pertains to the circumstance where a target element is a counting element in the first replacement list 370 and target data does not exist on a cache page of the cache 310. At 710, the controller 390 determines whether the target element is a newly created counting element. When the target element is a newly created counting element, at 720, the controller 390 sets a position of the target element as a start position of the first replacement list 370.

Otherwise, at 730, the controller 390 determines whether an access count of the target data in the storage device 320 indicated by the target element is less than a predefined threshold. When the access count is less than the predefined threshold, at 740, the controller 390 sets a position of the target element as a start position of the first replacement list 370. Alternatively, when the access count is larger than the predefined threshold, at 750, the controller 390 sets the target element as a high-frequency access element from the counting element, and at 760, sets a position of the target element as a start position of the first replacement list 370.

In addition, in some implementations, when the access count is larger than the predefined threshold, the controller 390 may copy the target data from the storage device 320 to a cache page in the cache 310. Further, the controller 390 may store in the access information a correspondence between an address of the target data in the storage device 320 and the cache page to which the target data is copied, so that the access information no longer indicates the number of times the target data in the storage device 320 has been accessed.

In this way, by means of implementations of the present disclosure, when the target element is a counting element in the first replacement list 370 and the target data does not exist on a cache page of the cache 310, a position of the target element in the replacement list may be updated, and hence the cache page may be replaced.

Figure 8A:
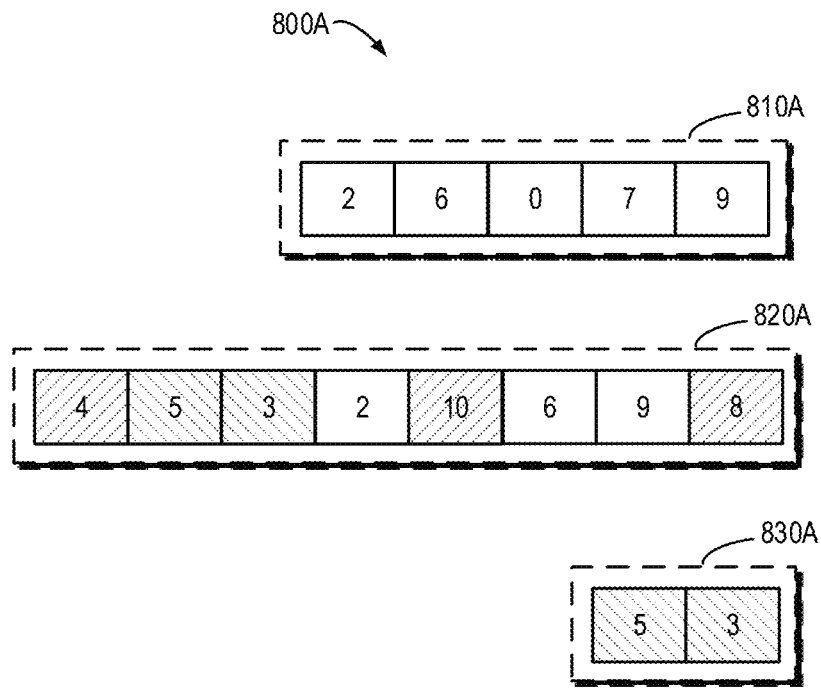
FIGS. 8A-8C each show a schematic view of an example for updating a position of a target element in a replacement list.
Figure 8B:
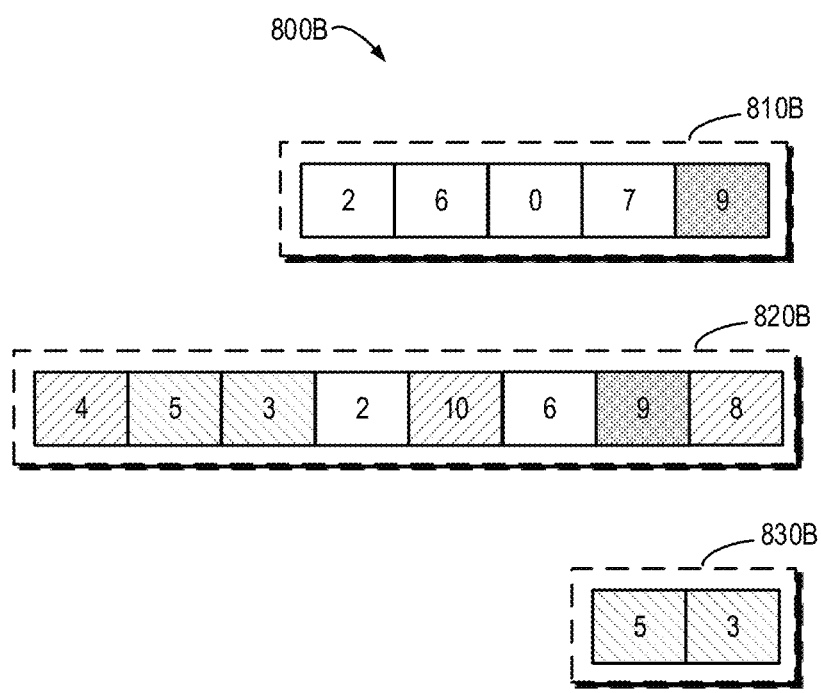
Figure 8C:
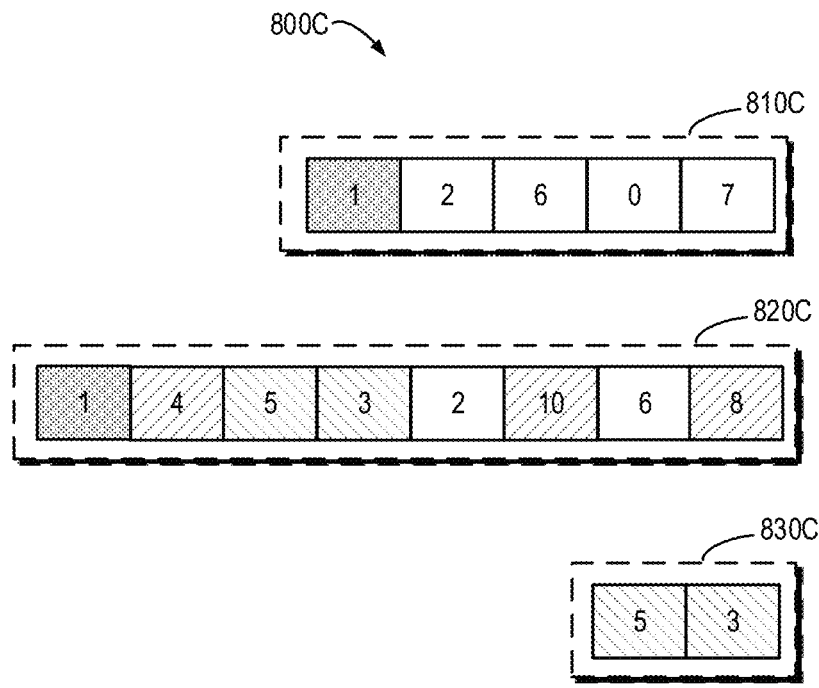

FIGS. 8A to 8C show respective schematic views of examples 800A-800C for updating a position of a target element in a replacement list. FIG. 8A shows an access history list 810A, a first replacement list 820A and a second replacement list 830A.

As shown in FIG. 8A, the access history list 810 A includes history information 2, history information 6, history information 0, history information 7 and history information 9. The first replacement list 820A includes a high-frequency access element 4, a low-frequency access element 5, a low-frequency access element 3, a counting element 2, a high-frequency access element 10, a counting element 6, a counting element 9 as well as a high-frequency access element 8. The counting element 2, the counting element 6 and the counting element 9 correspond to the history information 2, the history information 6 and the history information 9 respectively. In addition, the second replacement list 830A includes a low-frequency access element 5 and a low-frequency access element 3.

When the controller 390 receives an access request for target data 1 and there is no high-frequency access element, low-frequency access element or counting element associated with the target data 1, as shown in FIG. 8B, the controller 390 replaces history information 9 at an end position of an access history list 810B with history information 1 associated with the target data and replaces a counting element 9 in a first replacement list 820B with a counting element 1 associated with the target data.

Then, as shown in FIG. 8C, the controller 390 sets a position of the history information 1 as a start position of an access history list 810C. In addition, the controller 390 replaces a position of the counting element 1 with a start position of a first replacement list 820C. In this way, implementations of the present disclosure can increase the utilization and efficiency of the cache and improve the overall performance of the storage system.

Figure 9:
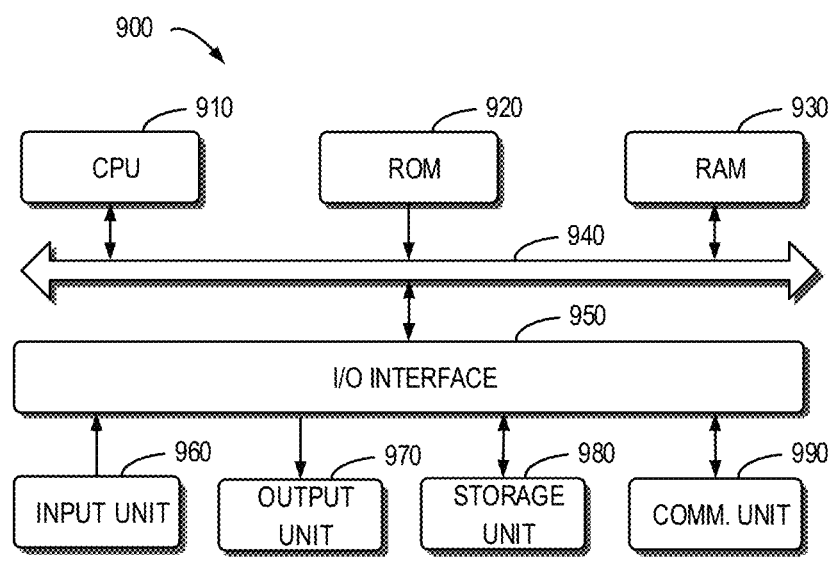
FIG. 9 shows a schematic block diagram of an example device which is applicable to implement implementations of the present disclosure.

FIG. 9 shows a schematic block diagram of an example device 900 which is applicable to implement implementations of the present disclosure. For example, the storage system 300 as shown in FIG. 3 may be implemented by the device 900. As depicted, the device 900 includes a central process unit (CPU) 910, which can execute various suitable actions and processing based on the computer program instructions stored in the read-only memory (ROM) 920 or computer program instructions loaded in the random-access memory (RAM) 930 from a storage unit 980. The RAM 930 can also store all kinds of programs and data required by the operations of the device 900. CPU 910, ROM 920 and RAM 930 are connected to each other via a bus 940. The input/output (I/O) interface 950 is also connected to the bus 940.

A plurality of components in the device 900 is connected to the I/O interface 950, including: an input unit 960, such as keyboard, mouse and the like; an output unit 970, e.g., various kinds of display and loudspeakers etc.; a storage unit 980, such as magnetic disk and optical disk etc.; and a communication unit 990, such as network card, modem, wireless transceiver and the like. The communication unit 990 allows the device 900 to exchange information/data with other devices via the computer network, such as Internet, and/or various telecommunication networks.

The above described each procedure and processing, such as the methods 400 to 700, can also be executed by the processing unit 910. For example, in some implementations, the methods 400 to 700 can be implemented as a computer software program tangibly included in the machine-readable medium, e.g., the storage unit 980. In some implementations, the computer program can be partially or fully loaded and/or mounted to the device 900 via ROM 920 and/or the communication unit 990. When the computer program is loaded to the RAM 930 and executed by the CPU 910, one or more steps of the above described methods 400 to 700 can be implemented. Alternatively, in other implementations, the CPU 910 also can be configured in other suitable manners to realize the above procedure/method.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcode, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only example rather than exhaustive and is not limited to the implementations of the present disclosure. Many modifications and alterations, without deviating from the scope and spirit of the explained various implementations, are obvious for those of ordinary skill in the art. The selection of terms in the text aims to best explain principles and actual applications of each implementation and technical improvements made in the market by each implementation, or enable other ordinary skilled in the art to understand implementations of the present disclosure.

We claim:

1. A method for managing a storage system, comprising:
receiving an access request for target data;
determining a storage position of the target data, the storage position indicating one of a storage device and a cache having a plurality of cache pages;
determining, based on the storage position, a target element corresponding to the target data contained in one of a first replacement list indicating recently accessed cache pages and a second replacement list indicating less recently accessed cache pages, the second replacement list associated with the first replacement list, the first replacement list including at least one counting element, at least one high-frequency access element indicating a corresponding cache page with a high access frequency in the cache, and at least one low-frequency access element indicating a corresponding cache page with a low access frequency in the cache, the counting element indicating an access count of data in the storage device, the second replacement list including at least one low-frequency access element, the low-frequency access element in the second replacement list indicating a corresponding cache page with a low access frequency in the cache; and
updating a position of the target element in the one of the first replacement list and the second replacement list containing the target element.

2. The method of claim 1, wherein determining the storage position comprises:
looking up access information about the target data in the cache; and
determining, based on the access information, whether the target data exists on a cache page of the cache.

3. The method of claim 1, wherein determining the target element corresponding to the target data comprises:
in response to determining that the storage position of the target data indicates the cache, determining that the target element is either the low-frequency access element in the second replacement list, the high-frequency access element in the first replacement list, or the low-frequency access element in the first replacement list.

4. The method of claim 1, wherein determining the target element corresponding to the target data comprises:
in response to determining that the target data is absent from the cache, determining whether access information about the target data exists in the cache, the access information indicating an access count of the target data in the storage device;
in response to determining that the access information exists in the cache, determining from the access information, that the target element is a counting element corresponding to the access information and located in the first replacement list; and
in response to determining that the access information is absent from the cache, creating, as the target element, a counting element associated with the target data in the first replacement list.

5. The method of claim 4, further comprising:
creating the access information about the target data in the cache, the access information indicating the access count of the target data in the storage device.

6. The method of claim 1, wherein the target element is in the first replacement list and the target data exists in the cache, and wherein updating the position of the target element comprises:
determining whether the target element is either the low-frequency access element or the high-frequency access element contained in the first replacement list;
in response to the target element being the high-frequency access element in the first replacement list, setting the position of the target element as a start position of the first replacement list; and
in response to the target element being the low-frequency access element in the first replacement list, updating, based on an access interval of a cache page indicated by the target element, the position of the target element in the first replacement list.

7. The method of claim 6, wherein updating the position of the target element in the first replacement list comprises:
obtaining a maximum value of access intervals of cache pages indicated by high-frequency access elements and low-frequency access elements in the first replacement list and the second replacement list respectively;
in response to the access interval exceeding the maximum value, setting the position of the target element as the start position of the first replacement list; and
in response to the access interval being less than the maximum value,
setting the target element from the low-frequency access element in the first replacement list to be the high-frequency access element in the first replacement list, and
setting the position of the target element as the start position of the first replacement list.

8. The method of claim 1, wherein the target element is determined to be in the second replacement list and the target data is determined to exist on a cache page of the cache, and wherein updating the position of the target element comprises:
obtaining a maximum value of access intervals of cache pages indicated by high-frequency access elements and low-frequency access elements in the first replacement list and the second replacement list respectively;
in response to an access interval of a cache page indicated by the target element exceeding the maximum value, setting the position of the target element as a start position of the second replacement list; and
in response to the access interval being less than the maximum value, updating the position of the target element based on a first number, the first number indicating a total number of elements in the first replacement list.

9. The method of claim 8, wherein updating the position of the target element comprises:
in response to the first number being less than a first predefined threshold, adding the target element from the second replacement list to a start position of the first replacement list.

10. The method of claim 8, wherein updating the position of the target element comprises:
in response to the first number exceeding a first predefined threshold, moving a high-frequency access element or a low-frequency access element at an end position of the first replacement list to the second replacement list, the moved high-frequency access element being set as a low-frequency access element; and
adding the target element from the second replacement list to a start position of the first replacement list.

11. The method of claim 8, further comprising:
determining whether an element at an end position of the first replacement list is a counting element; and
in response to determining the element is a counting element, removing the counting element from the first replacement list.

12. The method of claim 10, wherein moving the high-frequency access element or the low-frequency access element at the end position of the first replacement list to the second replacement list comprises:
determining a second number, the second number indicating the number of elements in the second replacement list;
in response to the second number being less than a second predefined threshold, moving the high-frequency access element or the low-frequency access element at the end position of the first replacement list to the second replacement list; and
in response to the second number exceeding the second predefined threshold,
removing a low-frequency access element at an end position of the second replacement list; and
moving the high-frequency access element or the low-frequency access element at the end position of the first replacement list to the second replacement list.

13. The method of claim 1, wherein responsive to determining that the target element is the counting element in the first replacement list and that the target data is absent from the cache, updating the position of the target element comprises:
setting the position of the target element as a start position of the first replacement list.

14. The method of claim 13, wherein setting the position of the target element as the start position of the first replacement list further comprises:
comparing an access count of the target data in the storage device indicated by the target element to a predefined threshold;
in response to the access count exceeding the predefined threshold,
changing the target element from the counting element to be the high-frequency access element.

15. The method of claim 13, further comprising:
comparing an access count of the target data in the storage device indicated by the target element with a predefined threshold; and
in response to the access count exceeding the predefined threshold,
copying the target data from the storage device to a cache page in the cache to which the target data is copied, and
storing, in the access information, a correspondence between an address of the target data in the storage device and the cache page to which the target data is copied, the access information no longer indicating the access count of the target data in the storage device.

16. A device for managing a storage system, comprising:
at least one processing unit;
at least one memory, coupled to the at least one processing unit and storing instructions executed by the at least one processing unit, the instructions, when executed by the at least one processing unit, causing the device to perform acts comprising:
receiving an access request for target data,
determining a storage position of the target data, the storage position indicating one of a storage device and a cache having a plurality of cache pages,
determining, based on the storage position, a target element corresponding to the target data contained in one of a first replacement list indicating recently accessed cache pages and a second replacement list indicating less recently accessed cache pages, the second replacement list associated with the first replacement list, the first replacement list including at least one counting element, at least one high-frequency access element indicating a corresponding cache page with a high access frequency in the cache, and at least one low-frequency access element indicating a corresponding cache page with a low access frequency in the cache, the counting element indicating an access count of data in the storage device, the second replacement list including at least one low-frequency access element, the low-frequency access element in the second replacement list indicating a corresponding cache page with a low access frequency in the cache, and
updating a position of the target element in the one of the first replacement list and the second replacement list containing the target element.

17. The device of claim 16, wherein determining the storage position comprises:
looking up access information about the target data in the cache; and
determining, based on the access information, whether the target data exists on a cache page of the cache.

18. The device of claim 16, wherein determining the target element corresponding to the target data comprises:

in response to determining that the storage position of the target data indicates the cache, determining that the target element is either the low-frequency access element in the second replacement list, the high-frequency access element in the first replacement list, or the low-frequency access element in the first replacement list.

19. The device of claim 16, wherein determining the target element corresponding to the target data comprises:
in response to determining that the target data is absent from the cache, determining whether access information about the target data exists in the cache, the access information indicating an access count of the target data in the storage device;
in response to determining that the access information exists in the cache, determining from the access information, that the target element is a counting element corresponding to the access information and located in the first replacement list; and
in response to determining that the access information is absent from the cache, creating, as the target element, a counting element associated with the target data in the first replacement list.

20. The device of claim 19, the acts further comprising:
creating the access information about the target data in the cache, the access information indicating the access count of the target data in the storage device.

21. The device of claim 16, wherein the target element is in the first replacement list and the target data exists in the cache, and wherein updating the position of the target element comprises:
determining whether the target element is either the low-frequency access element or the high-frequency access element contained in the first replacement list;
in response to the target element being the high-frequency access element in the first replacement list, setting the position of the target element as a start position of the first replacement list; and
in response to the target element being the low-frequency access element in the first replacement list, updating, based on an access interval of a cache page indicated by the target element, the position of the target element in the first replacement list.

22. The device of claim 21, wherein updating the position of the target element in the first replacement list comprises:
obtaining a maximum value of access intervals of cache pages indicated by high-frequency access elements and low-frequency access elements in the first replacement list and the second replacement list respectively;
in response to the access interval exceeding the maximum value, setting the position of the target element as the start position of the first replacement list; and
in response to the access interval being less than the maximum value,
setting the target element from the low-frequency access element in the first replacement list to be the high-frequency access element in the first replacement list, and
setting the position of the target element as the start position of the first replacement list.

23. The device of claim 16, wherein the target element is determined to be in the second replacement list and the target data is determined to exist on a cache page of the cache, and wherein updating the position of the target element comprises:
obtaining a maximum value of access intervals of cache pages indicated by high-frequency access elements and low-frequency access elements in the first replacement list and the second replacement list;
in response to an access interval of a cache page indicated by the target element exceeding the maximum value, setting the position of the target element as a start position of the second replacement list; and
in response to the access interval being less than the maximum value, updating the position of the target element based on a first number, the first number indicating a total number of elements in the first replacement list.

24. The device of claim 23, wherein updating the position of the target element comprises:
in response to the first number being less than a first predefined threshold, adding the target element from the second replacement list to a start position of the first replacement list.

25. The device of claim 23, wherein updating the position of the target element comprises:
in response to the first number exceeding a first predefined threshold, moving a high-frequency access element or a low-frequency access element at an end position of the first replacement list to the second replacement list, the moved high-frequency access element being set as a low-frequency access element; and
adding the target element from the second replacement list to a start position of the first replacement list.

26. The device of claim 23, the acts further comprising:
determining whether an element at an end position of the first replacement list is a counting element; and
in response to determining the element is a counting element, removing the counting element from the first replacement list.

27. The device of claim 25, wherein moving the high-frequency access element or the low-frequency access element at the end position of the first replacement list to the second replacement list comprises:
determining a second number, the second number indicating the number of elements in the second replacement list;
in response to the second number being less than a second predefined threshold, moving the high-frequency access element or the low-frequency access element at the end position of the first replacement list to the second replacement list; and
in response to the second number exceeding the second predefined threshold,
removing a low-frequency access element at an end position of the second replacement list; and
moving the high-frequency access element or the low-frequency access element at the end position of the first replacement list to the second replacement list.

28. The device of claim 16, wherein responsive to determining that the target element is the counting element in the first replacement list and that the target data is absent from the cache, updating the position of the target element comprises:
setting the position of the target element as a start position of the first replacement list.

29. The device of claim 28, wherein setting the position of the target element as the start position of the first replacement list further comprises:
comparing an access count of the target data in the storage device indicated by the target element to a predefined threshold;
in response to the access count exceeding the predefined threshold, changing the target element from the counting element to the high frequency access element.

30. The device of claim 28, the acts further comprising:

comparing an access count of the target data in the storage device indicated by the target element with a predefined threshold; and in response to the access count exceeding the predefined threshold, copying the target data from the storage device to a cache page in the cache to which the target data is copied, and storing, in the access information, a correspondence between an address of the target data in the storage device and the cache page to which the target data is copied, the access information no longer indicating the access count of the target data in the storage device.

31. A computer program product having a non-transitory computer readable medium which stores a set of instructions to manage a storage system; the set of instructions, when carried out by computerized circuitry, causing the computerized circuitry to perform a method of:

receiving an access request for target data;

determining a storage position of the target data, the storage position indicating one of a storage device and a cache having a plurality of cache pages;

determining, based on the storage position, a target element corresponding to the target data contained in one of a first replacement list indicating recently accessed cache pages and a second replacement list indicating less recently accessed cache pages, the second replacement list associated with the first replacement list, the first replacement list including at least one counting element, at least one high-frequency access element indicating a corresponding cache page with a high access frequency in the cache, and at least one low-frequency access element indicating a corresponding cache page with a low access frequency in the cache, the counting element indicating an access count of data in the storage device, the second replacement list including at least one low-frequency access element, the low-frequency access element in the second replacement list indicating a cache page with a low access frequency in the cache; and updating a position of the target element in the one of the first replacement list and the second replacement list containing the target element.

* * * * *